United States Patent [19]

LaBarge

[11] Patent Number: 4,764,389
[45] Date of Patent: Aug. 16, 1988

[54] METHOD OF ACCELERATING FRUIT RESPIRATION

[75] Inventor: Louis P. LaBarge, Vista, Calif.

[73] Assignee: LaBarge Universal Ripener, Inc., Norfolk, Va.

[21] Appl. No.: 105,477

[22] Filed: Oct. 5, 1987

Related U.S. Application Data

[63] Continuation of Ser. No. 855,372, Apr. 24, 1986, abandoned, which is a continuation-in-part of Ser. No. 434,586, Oct. 15, 1982, abandoned.

[51] Int. Cl.$^4$ ............................................. A23B 7/152
[52] U.S. Cl. .................................. 426/312; 426/419; 99/468; 99/474
[58] Field of Search ............... 426/418, 419, 312, 316, 426/49, 61; 99/468, 473, 474

[56] References Cited

U.S. PATENT DOCUMENTS

| | | | |
|---|---|---|---|
| 1,927,100 | 9/1933 | Skinner | 99/468 |
| 2,000,637 | 5/1935 | Hatch | 99/474 |
| 2,095,455 | 10/1937 | Simonson | 99/468 |
| 2,342,998 | 2/1944 | Bieret | 99/468 |
| 3,620,765 | 11/1971 | McDonnell et al. | 426/312 |

FOREIGN PATENT DOCUMENTS 0227380  1/1980  Japan .................................. 426/316

Primary Examiner—Elizabeth Weimar
Attorney, Agent, or Firm—Albert L. Gabriel

[57] ABSTRACT

A fruit ripening system wherein a continuous inflow of fresh air and ethylene gas is provided into a fruit ripening chamber in correct proportions to form a fruit ripening gas mixture that will predictably ripen fruit in a very short period of time, regardless of the previous state of ripening of the fruit. At the same time, the ripening chamber is continuously purged of carbon dioxide that is a byproduct of the ripening process so that during the ripening process a concentration of carbon dioxide sufficient to materially impede the ripening process is never allowed to build up. Critical parameters are defined for ripening temperature, the minimum ethylene gas concentration, time of exposure to the ethylene gas, and purging of carbon dioxide.

16 Claims, 7 Drawing Sheets

FIG. 1
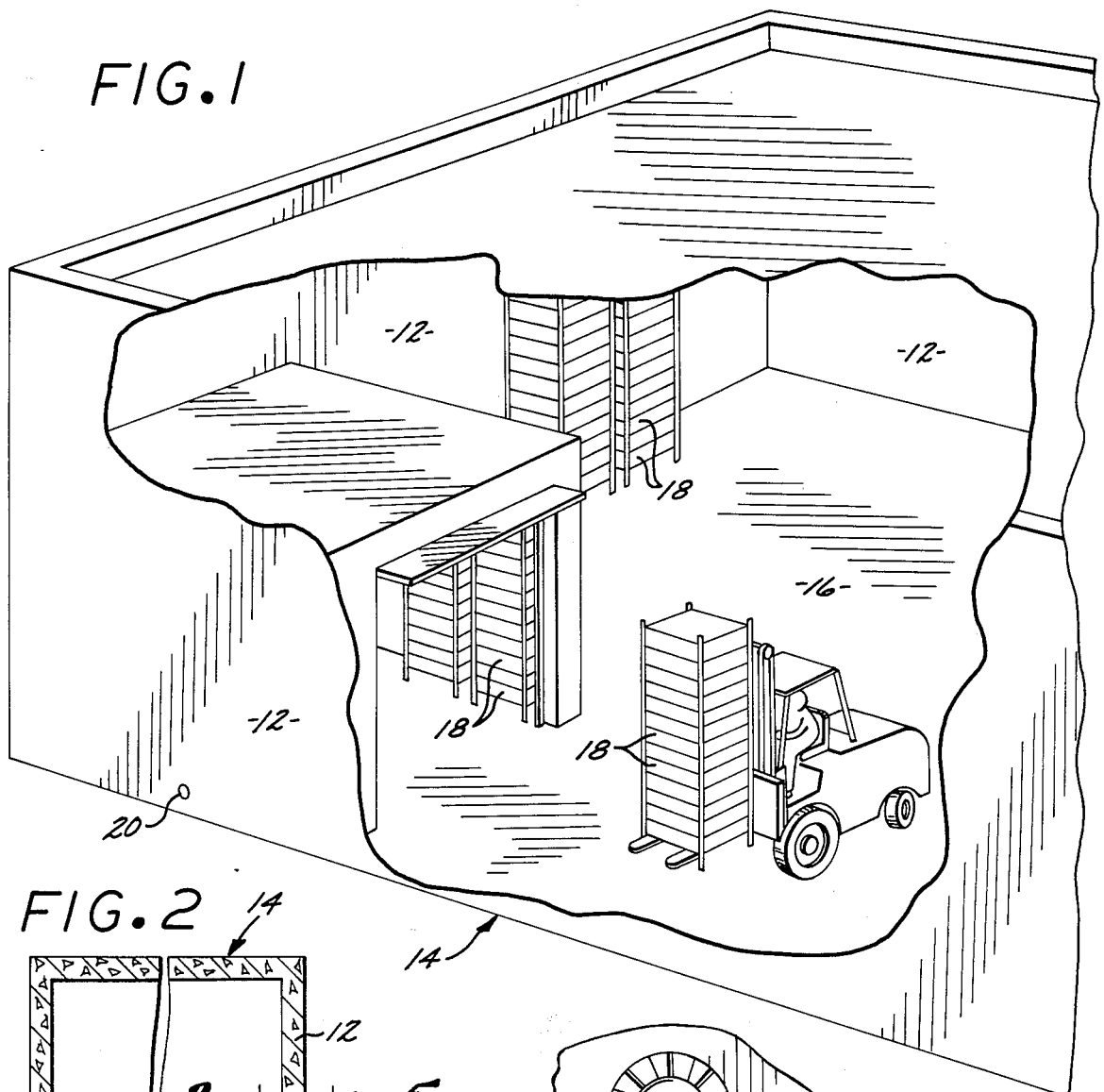
FIG. 2
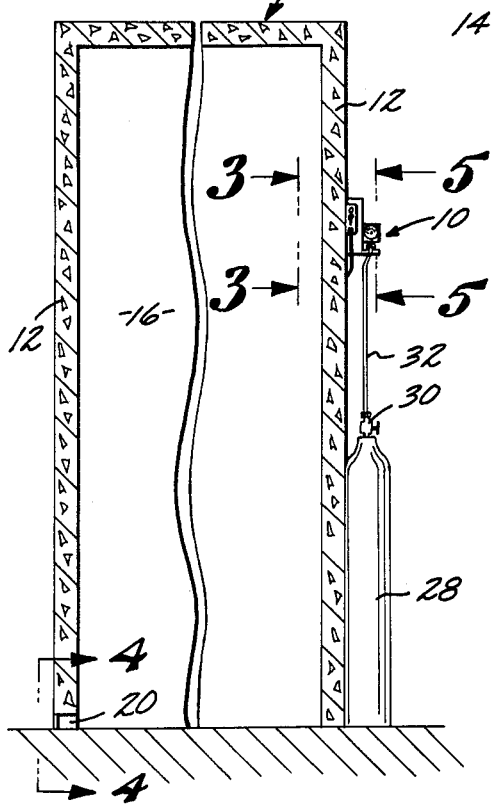
FIG. 3
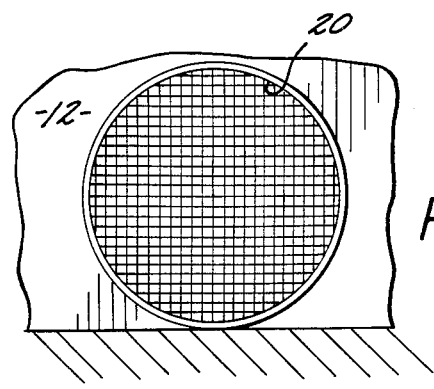
FIG. 4

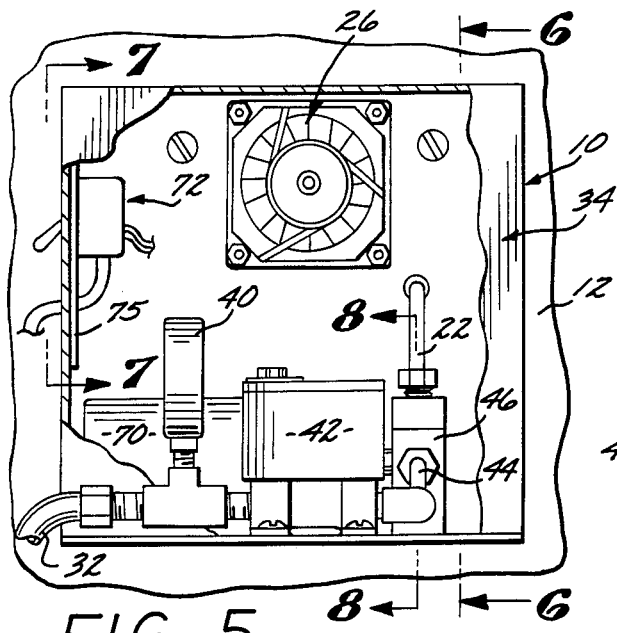
FIG.5
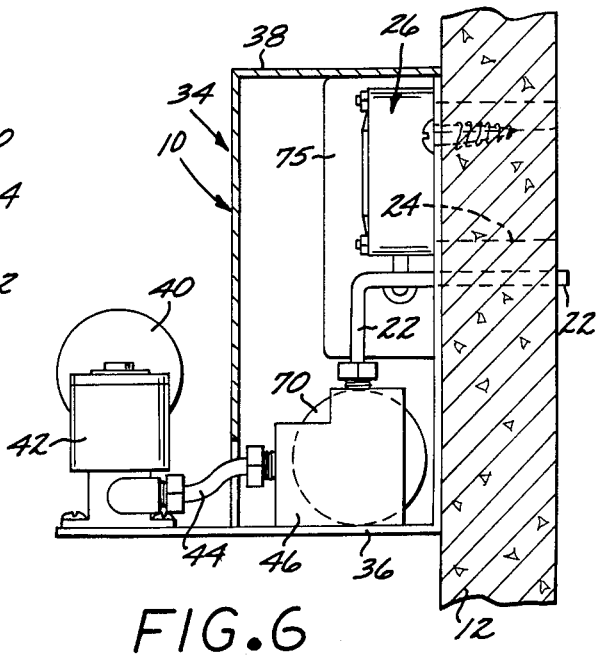
FIG.6
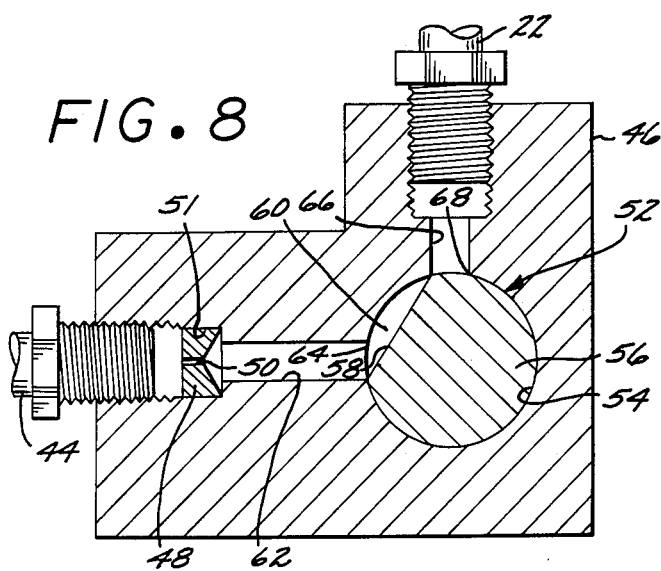
FIG.8    FIG.9
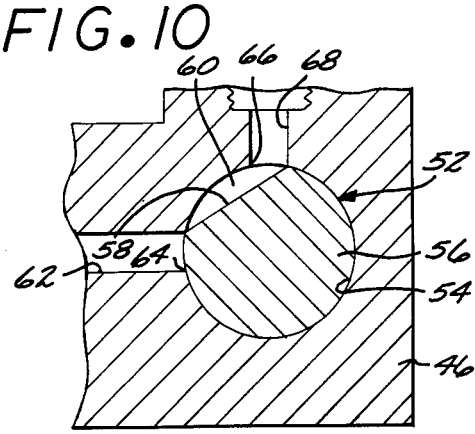
FIG.10
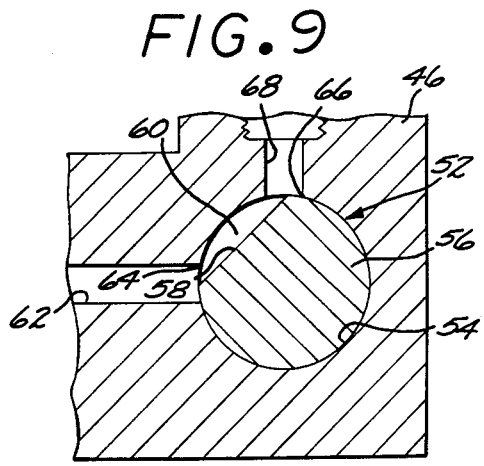
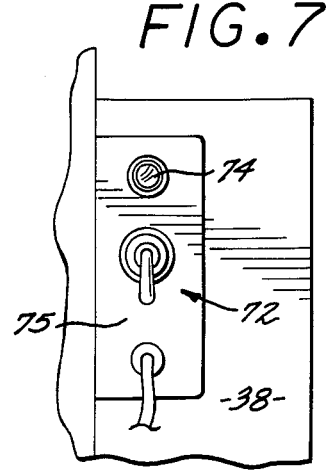
FIG.7

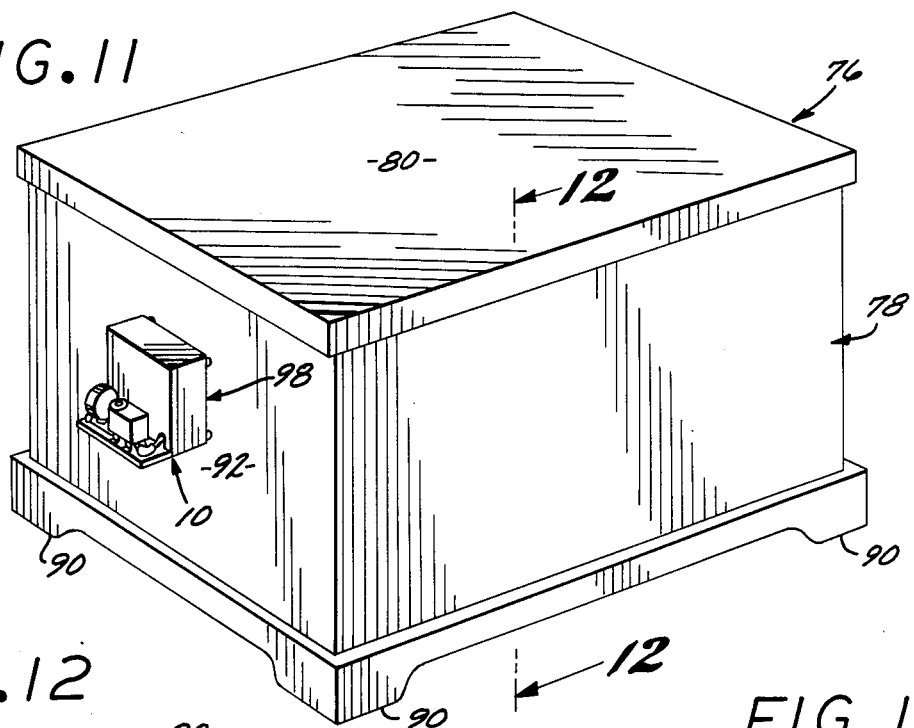
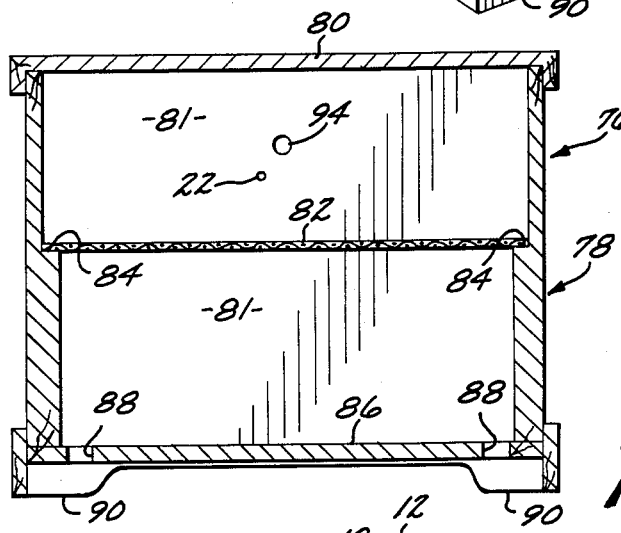
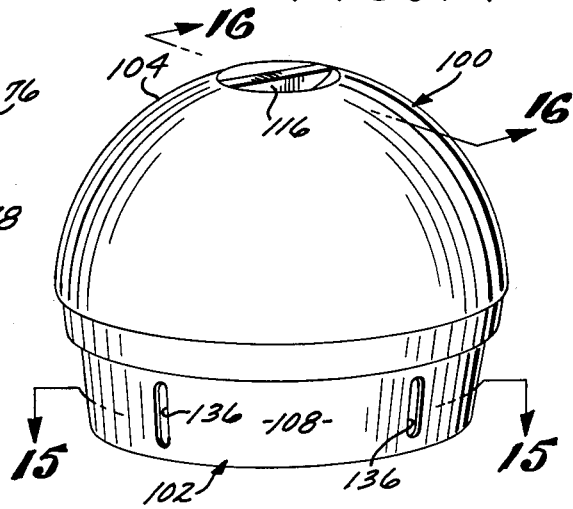
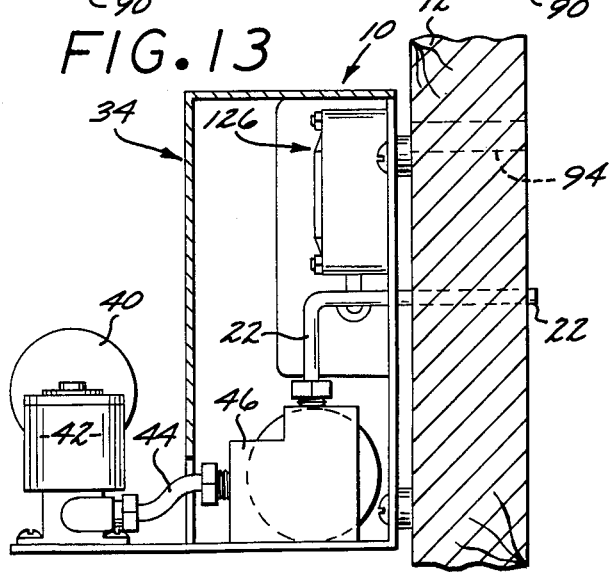
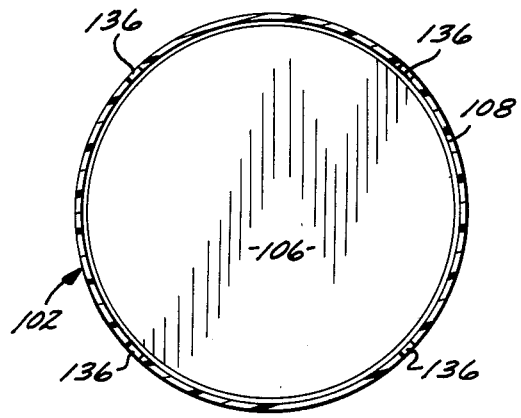

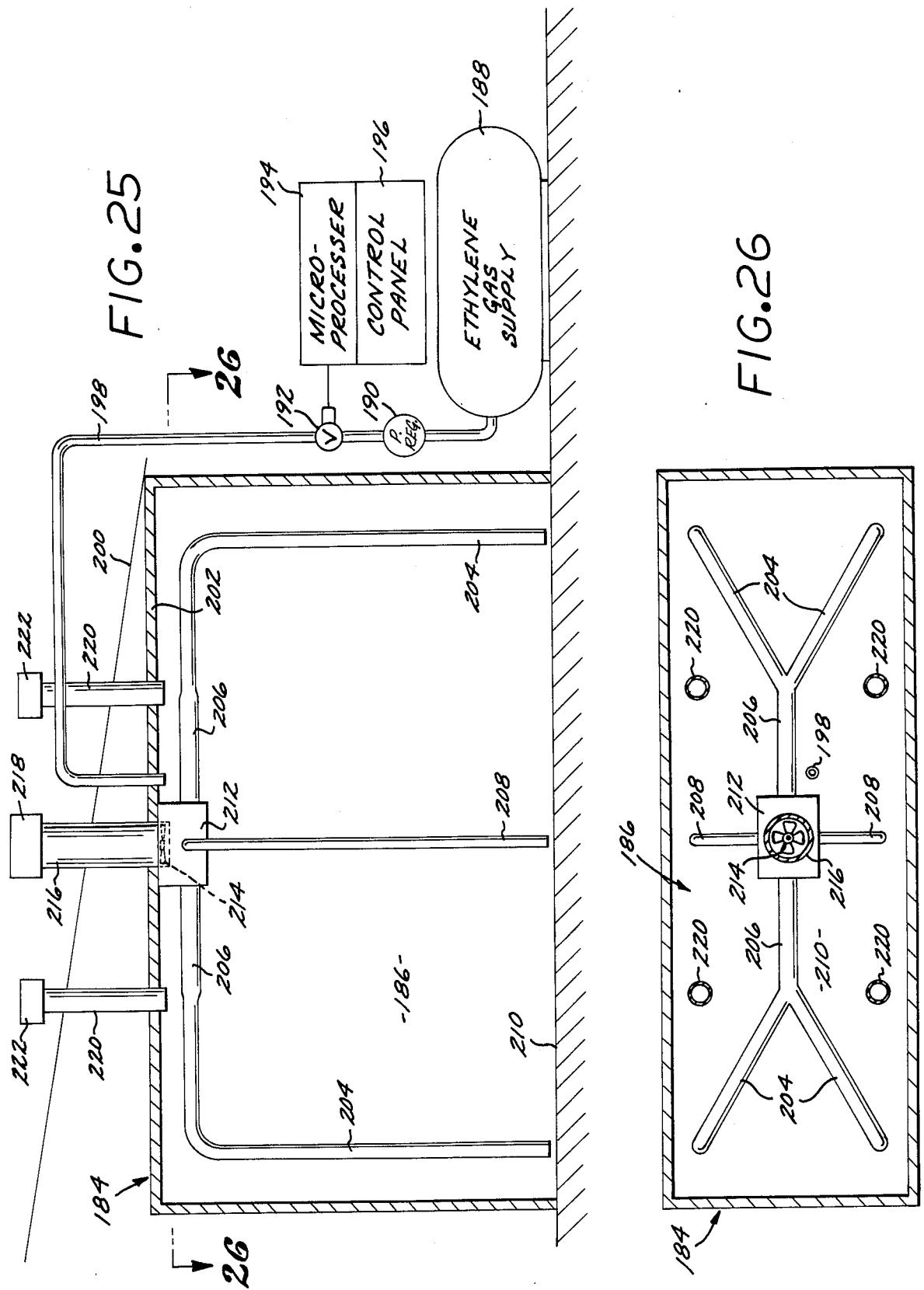

METHOD OF ACCELERATING FRUIT RESPIRATION

RELATED APPLICATION

This application is a continuation of application Ser. No. 855,372, filed Apr. 24, 1986, now abandoned, which is continuation-in-part of application Ser. No. 434,586, filed Oct. 15, 1982, now abandoned.

BACKGROUND OF THE INVENTION

1. Field of the Invention

The present invention is in the field of fruit ripening methods and apparatus, and the invention relates more particularly to methods and apparatus involving an artificially prepared atmosphere containing a small proportion of ethylene gas.

2. Description of the Prior Art

There has been a long-felt need for a method and apparatus capable of accelerating the ripening cycle of fruit to a shortened period of time such as only about 48 hours so that the availability of fully ripened fruit could be closely coordinated to marketing or user's requirements. This need has been in at least three areas: (1) at the commercial level in both packing houses and wholesaler's storage facilities; (2) also at the commercial level at markets, hotels and restaurants; and (3) in the home.

For many years there have been attempts to ripen fruit in a "banana" room, where the fruit to be ripened was placed in the same room as already ripe bananas which, during the ripening process, naturally gave off ethylene gas. However, carbon dioxide, which is a natural inhibitor of the ripening process, was also given off during the ripening of both the fruit being treated and the bananas, so that results were generally unsatisfactory. The density of carbon dioxide is more than four-thirds that of air and ethylene gas, so that carbon dioxide accumulated in the lower part of the ripening room, with the result that there was often little or no ripening of the lowermost fruit. While at least some of this accumulated carbon dioxide was accidentally released when the doors of the ripening room were opened, such occasional and accidental release of carbon dioxide was insufficient to avoid the retarding effects of carbon dioxide on the ripening cycle.

A home fruit ripening unit has been recently marketed in the United States which utilizes the same basic principle of operation as the "banana room," and this home ripening unit is generally ineffective for the same reasons. This home unit is generally in the form of a covered bowl in which already ripe or overripe fruit is placed in a lower portion, and the fruit to be ripened in an upper portion so as to be subjected to the ethylene gas given off by the already ripe fruit. The problem here, again, is that accumulating carbon dioxide caused by the ripening process is a barrier to proper ripening of the lower portion of the fruit, and the result is that while some of the fruit may be ripened, some of it may not be, and some may have portions thereof which are both ripened and unripened.

A more modern system for ripening fruit on a commercial scale which is presently sometimes used involves placing fruit in a packing house room or wholesale storage room, introducing ethylene gas into the room, and allowing the proportion of ethylene gas to rise to a level of about 500 to 1,000 parts per million, and then allowing the fruit to absorb the ethylene gas over a ripening period of a day or two. The problem with this system is that because of carbon dioxide accumulation in the room, it is necessary every 2–4 hours to open the doors and flush the air and carbon dioxide out of the room, and then to close the doors again and rebuild the ethylene gas concentration back up to the approximately 500 to 1,000 parts per million. This sequence had to be repeated over the entire length of the ripening period, and the resulting requirement of constant maintenance over the entire ripening period renders the entire system impractical. Also, this procedure of opening the doors of the room to release carbon dioxide and air and then replacing the air and ethylene gas was not a really effective way of removing the carbon dioxide, and the lower lugs of fruit were usually in carbon dioxide anyway to the extent that they did not ripen effectively.

Such ripening procedures have been haphazard at best, and have not utilized critical parameters of ripening temperature, ethylene gas concentration, duration of exposure to ethylene gas, and minimum allowable carbon dioxide concentration, all of which must be adhered to in order to have an effective fruit ripening process.

Most fruit must be picked and shipped green or unripened because of shipping problems with ripe fruit. Then, a ripening period of time generally on the order of two or three weeks must be awaited before the fruits are ready for consumption. Such ripening period of time is even longer for avocados and several other fruits because the enzymic action necessarily associated with ripening will not normally commence until 5–7 days after picking. Storage of the fruit at the wholesaler's, market, hotel, restaurant, or the like over the accumulated ripening period of time occupies valuable space, and it is extremely difficult to coordinate ripening times and market demands, particularly for fruit such as the avocado which is quite delicate and also has an extended ripening time.

While this problem of coordinating ripening time and market needs is largely solved by the present invention, there is another problem of storage facilities required for ripening that is peculiar to the avocado industry. Partly because of the fragility of the avocado, there are always a large number of avocados in any batch that are visually unacceptable for the commercial market as whole fruit because of cuts, scars and other deformities. These are still usable to make guacamole, but heretofore they have occupied valuable storage space for the extended period of time required for the natural ripening process to occur before they could be processed as guacamole. The need for such additional storage space and time could be virtually completely eliminated by a practical and reliable artificial system such as that of the present invention.

SUMMARY OF THE INVENTION

In view of these and other problems in the art, it is a general object of the present invention to provide a practical and reliable fruit ripening system which, when applied to fruit in any ripening stage, even the earliest, is capable of bringing any fruit to a fully ripened condition within a period of time ranging between about 36 hours and 48 hours.

Another general object of the invention is to provide a fruit ripening system which is adaptable to the ripening of fruit in almost any quantity, ranging from a large commercial quantity such as a room full of fruit all of the way down to a small home use quantity of about 1–6 pieces of fruit.

Another object of the invention is to provide a dynamic or active fruit ripening unit which may be operatively associated with a commercial ripening chamber of almost any dimensions, from a large wholesale produce storage room or packing house room of about 16 feet by 16 feet on the sides and about 8 feet high, or an even larger chamber, down to a four-lug box, dynamic forms of the invention involving the continuous purging of carbon dioxide out of the ripening chamber by continuously flowing fresh air into the chamber, while at the same time either continuously or intermittently injecting a tiny flow of ethylene gas into the chamber.

A further object of the invention is to provide a static or passive fruit ripening system particularly suitable for home use which is ventilated so as to also cause the substantially continuous inflow of fresh air and outflow of carbon dioxide, and wherein a tiny, continuous flow of ethylene gas is provided from an evaporative liquid solution of ethylene gas.

A still further object of the invention is to define critical limits and ranges of ripening temperature, ethylene gas concentration, duration of exposure of the fruit to ethylene gas, and minimum allowable carbon dioxide concentration, all of which are coordinated to provide a highly effective and reliable ripening process.

Yet another object of the invention is to provide a commercial ripening system which is conveniently adaptable to rooms in existing buildings and to trailers.

An additional object of the invention is to provide a fruit ripening system utilizing ethylene gas which positively precludes buildup of an explosive gas mixture despite injection valve failure.

The basic principle of operation of both the dynamic and the static forms of the present invention is to provide a continuous inflow of fresh atmospheric air into a fruit ripening chamber and at the same time provide a continuous inflow into the ripening chamber of ethylene gas in correct proportion to the air inflow so as to form a ripening gas mixture that will predictably ripen fruit in a very short period of time. The air inflow continuously purges the ripening chamber of carbon dioxide produced during the ripening process so that during the accelerated ripening time a sufficient concentration of carbon dioxide is never allowed to build up to a point that would materially impede the ripening process.

Two dynamic forms of the invention are shown and described which are for commercial ripening purposes. These utilize a ripening chamber which may be a very large one such as a room defined within a building structure or the inside of a trailer. In the dyanamic forms of the invention, pressure regulated ethylene gas from a source such as a tank is metered through valve and orifice means into an upper zone in the chamber, and the carbon dioxide formed as a part of the ethylene respiration cycle of the fruit is removed from a bottom zone or zones of the chamber where it tends to collect because of its higher density than both air and ethylene gas. The carbon dioxide is removed by the procedure of continuously circulating new air into the chamber so that the air will be completely exchanged periodically during the course of the exposure of fruit to ethylene gas in the ripening chamber. In one dynamic form of the invention, air is blown into the chamber, and the chamber is ported proximate its bottom so that the air leaves from the bottom of the chamber, carrying the carbon dioxide with it. In another dynamic form of the invention, the air and carbon dioxide are drawn out of the chamber through ducts which pick up the air and carbon dioxide proximate the bottom of the chamber and expel them outside of the chamber, this being accomplished by a fan in the duct system.

An important aspect of the invention is definition and utilization of critical limits and ranges for the ethylene gas treatment. These include a relatively narrow temperature range of the fruit pulp when it is subjected to the ethylene gas treatment, a minimum concentration of ethylene gas for the treatment to be effective, a time duration for application of ethylene gas, and a very low concentration of carbon dioxide above that which is normal in air. The concentration of carbon dioxide is determined by the rate at which the air is exchanged in the chamber.

In one dynamic form of the invention, the ethylene gas is periodically injected for a short time interval during the entire period of time over which the fruit is subjected to the ethylene gas, and a sufficiently small injection orifice is employed to assure that ethylene gas concentration cannot build up to an explosive mixture.

The static or passive form of the invention, intended primarily for home use, has a system of chambers and ventilating slots which cause the substantially continuous inflow of fresh air to the fruit ripening chamber and exhausting of carbon dioxide from the fruit ripening chamber, and because of the extremely minute rate of flow of ethylene gas required, and also because of economic and safety considerations, utilizes an evaporative solution of ethylene gas dissolved in ethyl alcohol to provide the continuous flow of ethylene gas to the ripening chamber over the ripening period of time such as about 24 hours. The alcohol-ethylene gas solution is provided for the static or passive home ripening unit in small packets of absorbent material saturated with the solution and sealed in aluminum foil, one of such packets being opened for each use and the saturated dispenser pad being placed in a small container in the ripening unit from which evaporating ethylene gas is slowly metered through tiny orifices into the ripening chamber.

BRIEF DESCRIPTION OF THE DRAWINGS

These and other objects of the invention will become more apparent in reference to the following description and the accompanying drawings, wherein:

FIG. 1 is a perspective view, with portions broken away, showing a large fruit ripening chamber such as a wholesale produce storage room or packing house room to which the dynamic or active form of the invention may be applied;

FIG. 2 is a vertical section, with portions shown in elevation, illustrating the ripening gas mixture control unit of the invention operatively connected to a wall that defines the fruit ripening chamber of FIG. 1;

FIG. 3 is an enlarged, fragmentary elevational view taken on the line 3–3 in FIG. 2 showing the air fan and ethylene gas injection tube exposed to the inside of the chamber;

FIG. 4 is a fragmentary elevational view similar to FIG. 3 showing one of the carbon dioxide exhaust ports through the wall of the structure defining the ripening chamber;

FIG. 5 is a front elevational view of the gas mixture control unit that is seen in side elevation in FIG. 2, on a larger scale, with portions of the housing broken away to expose the operative parts of the mixture control unit;

FIG. 6 is a vertical section taken on the line 6—6 in FIG. 5;

FIG. 7 is a fragmentary elevational view taken on the line 7—7 in FIG. 5 showing the electric power on-off switch and LED indicator lamp;

FIG. 8 is an enlarged, fragmentary sectional view taken on the line 8—8 in FIG. 5, with portions in elevation, showing the tandem or sequential arrangement of the tiny orifice and the metering valve employed to provide a very tiny rate of flow of ethylene gas to the fruit ripening chamber;

FIG. 9 is a fragmentary view of a portion of FIG. 8 showing the valve element shifted from a closed to an open position;

FIG. 10 is a view similar to FIG. 9 showing the valve element moved further to again be in a closed position;

FIG. 11 is a perspective view showing the ripening gas mixture operatively associated with a four-lug fruit container;

FIG. 12 is a vertical section taken on the line 12—12 in FIG. 11;

FIG. 13 is an enlarged vertical section similar to FIG. 6, but with the gas mixture control unit applied to the four-lug container of FIGS. 11 and 12;

FIG. 14 is a perspective view illustrating the static or passive form of the invention applied in a home ripener unit;

FIG. 15 is a horizontal section taken on the line 15—15 in FIG. 14 showing the carbon dioxide exhaust slots employed in the static or passive form of the invention;

FIG. 25 is a vertical sectional view, partly in elevation, and partly diagramatic, illustrating a dynamic fruit ripening system according to the invention wherein the carbon dioxide and air are blown out of the ripening chamber, with the resulting reduced pressure drawing fresh air into the ripening chamber, to provide the required air exchange for removing the carbon dioxide; and FIG. 26 is a horizontal sectional view taken on the line 26—26 in FIG. 25.

DETAILED DESCRIPTION

Figure 16:
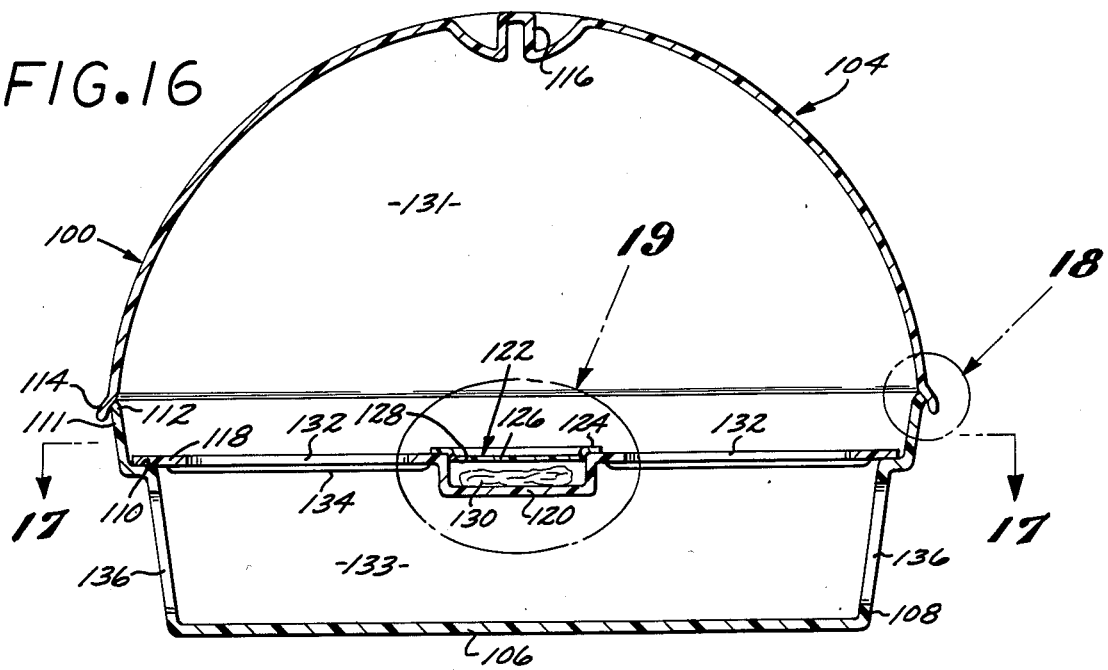
FIG. 16 is an axial, vertical section taken on the line 16—16 in FIG. 14.

Referring to the drawings, FIGS. 1–13, 25 and 26 illustrate dynamic or active forms of the invention, while FIGS. 14–20 illustrate a static or passive form of the invention. The dynamic forms of the invention are employed for ripening commercial quantities of fruit, whereas the static form of the invention is employed for ripening only a few pieces of fruit.

FIGS. 1–10 show a first dynamic or active form of the invention applied to a large fruit ripening chamber such as a wholesale produce storage room or packing house room, and illustrate details of construction of this form of the invention. This dynamic or active form of the invention includes a gas mixture control unit generally designated 10 attached to the outside of one of the walls 12 of a building structure 14 that defines therein a fruit ripening chamber 16 such as a wholesale produce storage room or packing house room. The gas mixture control unit communicates through wall 12 to which it is attached to the inside of the ripening chamber, and functions in the manner described in detail hereinafter to produce and maintain within chamber 16, over a period of time such as approximately 24 hours, a gas composition capable of effecting the rapid ripening of fruit that reposes within chamber 16 during such period of time. Typically, the fruit will be contained in lug boxes 18 that have breather openings (not shown) exposing the fruit contained therein to the atmosphere created by the gas mixture control unit 10 within ripening chamber 16. The typical wholesale produce storage room or packing house room may have dimensions of about 16 feet for the lengths of the walls 12 and about 8 feet in inside height. Stacks of lug boxes 18 may be moved into and out of chamber 16 by means of a forklift truck as shown in FIG. 1.

During the ripening period of time, gas mixture control unit 10 continuously blows fresh atmospheric air into ripening chamber 16 and at the same time continuously injects a very minute amount of ethylene gas into ripening chamber 16 which mixes homogeneously with the air to form the ripening gas mixture. At the same time, the air that is blown into chamber 16 by control unit 10 continuously purges chamber 16 of carbon dioxide which is a byproduct of the ripening process that, if allowed to remain in chamber 16, would impede or prevent the accelerated ripening cycle produced by the ethylene gas-enriched atmosphere.

Purging of the carbon dioxide from ripening chamber 16 is accomplished by providing carbon dioxide exhaust ports 20 through walls 12 proximate the bases thereof and locating control unit 10 on the upper half of wall 12 to which it is attached. Preferably at least two of the carbon dioxide ports 20 are located in opposite walls 12. By placing qas mixture control unit 10 on the upper half of its wall 12 and having carbon dioxide exhaust ports 20 at the bases of opposite walls, the air is blown by control unit 10 into the upper part of chamber 16 and has a generally downward direction of movement toward exhaust ports 20. The carbon dioxide that is continuously being formed during the ripening process is considerably more dense than air, and this factor coupled with the generally downward flow that results from the vertical displacement between control unit 10 and exhaust ports 20 assures the continuous and substantially complete removal of carbon dioxide from the chamber so that it has no material adverse effect upon the ripening process.

The molecular weights of air and ethylene gas are approximately the same, both being a little over 28, and these gases readily mix to form a very homogeneous mixture. On the other hand, carbon dioxide is much heavier, having a molecular weight of about 44, and it does not readily mix with air. Thus, while the desired air-ethylene gas mixture will remain generally uniform throughout ripening chamber 16 during the prescribed ripening period, the carbon dioxide will be continuously separated out and exhausted from ripening chamber 16. Looking from the inside of ripening chamber 16 at wall 12 upon which mixture control unit 10 is mounted as viewed in FIG. 3, a small ethylene gas injection tube 22 comes through wall 12 from control unit 10, and an air injection port 24 through wall 12 allows air to be blown into chamber 16 from a fan 26, preferably of the turbine type, which forms a part of control unit 10. As seen in FIG. 2, a pressurized cylinder 28 of ethylene gas located on the outside of wall 12 provides the source of ethylene gas. Cylinder 28 has a selectively adjustable pressure regulator 30 at its output, and this is connected through an ethylene supply tube 32 to control unit 10.

Referring now to FIGS. 5–10, gas mixture control unit 10 has a housing generally designated 34 preferably consisting of two sections, an L-shaped mounting section 36 that is screwed or bolted to wall 12, and a cover section 38 that is preferably removable for inspection and servicing of the parts of control unit 10.

Ethylene supply tube 32 from cylinder or tank 28 is connected to a pressure gauge 40 which, in turn, has a fluid connection to solenoid safety valve 42 which, when open, provides fluid communication from ethylene supply tube 32 through another tube 44 to an ethylene gas metering block 46. The solenoid safety valve 42 is a normally closed valve that is opened upon electrical energization of the system and remains open to provide ethylene gas to gas metering block 46 as long as the system continues to be electrically energized. However, in the event of the inadvertent failure of the electrical supply to the system, solenoid safety valve 42 will automatically close, thereby completely shutting off the ethylene gas supply from tube 32 to gas metering block 46, and hence to ripening chamber 16, so as to positively prevent buildup of the ethylene gas concentration in chamber 16 to an explosive value. Such explosive concentration of ethylene gas in air is approximately 30,000–33,000 parts per million, which is many times the range of ethylene gas concentrations employed by the present invention.

Gas metering block 46 embodies a tandem or sequential arrangement of flow metering devices for greatly reducing the flow rate of the ethylene gas provided from pressure regulator 30 to the tiny flow rate required to establish and hold the very small proportion of ethylene gas in the air-ethylene gas mixture within ripening chamber 16. The first of this sequence of flow reducing and metering devices is an orifice plug 48 having a tiny orifice 50 therethrough located in inlet bore 51 of metering block 46. The second of these sequential flow reducing and metering devices is a gas metering valve, generally designated 52, within metering block 46 that utilizes block 46 as its valve body.

Gas metering valve 52 includes a cylindrical valve chamber 54 in block 46, and a valve element 56 rotatable within chamber 54. Valve element 56 has a cylindrical external shape that is complementary to the cylindrical chamber 54, except for a flat peripheral section 58 parallel to the axis of rotation of valve element 56 which provides a peripheral valve passage 60. A valve inlet passage 62 in block 46 provides communication between orifice 50 and valve chamber 54 at a valve inlet port 64; while a valve outlet passage 66 that is directed at right angles to inlet passage 62 communicates with valve chamber 54 through an outlet port 68. The ethylene gas injection tube 22 which leads to ripening chamber 16 is connected to metering block 46 so as to communicate with valve outlet passage 66.

Valve element 56 is rotatively driven by means of a geared electric motor 70 which rotates valve element 56 at a speed which is preferably quite low, as for example about one rpm. However, the gas flow metering rate of valve 52 is not controlled by the rate of rotation of valve element 66, but by the depth of the peripheral flat section 58 toward the axial center of valve element 56. With the flat section 58 at the depth shown in FIGS. 8, 9 and 10, during one complete rotation of valve element 56 at one rpm, the valve will only be open, i.e., valve passage 60 will only provide communication between inlet and outlet ports 64 and 68, respectively, for approximately two seconds. Thus, with the valve configuration illustrated, valve 52 will further reduce the already greatly reduced flow of ethylene gas from the tiny orifice 50 by a factor of approximately 30 to 1. FIGS. 8, 9 and 10 illustrate, in sequence, clockwise rotary movement of valve element 56 from the fully closed position of FIG. 8 in which valve passage 60 fully communicates with inlet port 64 but does not communicate with outlet port 68; to the fully opened position of FIG. 9 in which valve passage 60 communicates with approximately half of each of the inlet and outlet ports 64 and 66, respectively; to the again fully closed position of FIG. 10 in which valve passage 60 fully communicates with outlet port 66 but no longer communicates with inlet port 64. Then, the valve element must rotate all of the way back around to the position of FIG. 8 before valve passage 60 is ready to again pass through the narrow arc of travel in which it provides communication between ports 64 and 68.

Electric power is provided through an on-off switch 72, seen in FIGS. 5 and 7, to energize air fan 26, valve element 70, and solenoid safety valve 42. An LED indicator lamp 74 is illuminated when switch 72 is in its closed, on position to energize control unit 10. On-off switch 72 and LED indicator lamp 74 are mounted on an ear or tab 75 extending outwardly at right angles from one edge of the mounting section 36 of housing 34 and are exposed through a suitable opening in the cover section 38 of housing 34. Normally pressure regulator valve 30 at ethylene gas source cylinder 28 and electric power switch 72 will both be turned on at the beginning of a ripening period, and then they both will be turned off at the end of the ripening period and the desired very small proportion of ethylene gas will be automatically established and maintained in the ripening chamber 16 by gas mixture control unit 10. However, in the event of a power failure or accidental turning of switch 72 to the off position during a ripening period, ethylene gas would continue to be provided to control unit 10 from the still-open pressure regulator valve 30, and if rotating valve element 56 of gas metering valve 52 happened to stop at an open position such as shown in FIG. 9, then ethylene gas would continue to be conducted into ripening chamber 16, but at a much faster rate than during normal operation of control unit 10 because of the continuously open metering valve 52. Solenoid safety valve 42 is in the ethylene gas flow line to metering valve 52 for the purpose of positively blocking the flow of ethylene gas upstream of metering valve 52 to prevent any possibility of such continued inadvertent flow of ethylene gas to ripening chamber 16, and therefore to positively prevent the accidental buildup of an explosive ethylene gas mixture wtihin ripening chamber 16.

Gas mixture control unit 10 is adapted to produce an optimum proportion of ethylene gas in the air within ripening chamber 16 and optimum rate of exchange of the air within ripening chamber 16 for any size chamber, as for example a room 16 feet on the sides and 8 feet high, all of the way down to the chamber within a four-lug container such as the container 76 illustrated in FIGS. 11-13 of the drawings. The fan 26 of gas mixture control unit 10 is selected to provide approximately the correct rate of air flow into ripening chamber 16 for a complete exchange of the air within chamber 16 at a rate which will keep the carbon dioxide concentration down within a low range that will minimize interference by the presence of carbon dioxide with the absorption of ethylene gas, as discussed hereinafter in connection with FIG. 24. Air injection port 24 is provided with substantially the same diameter as the turbine of blower 26 to admit substantially this entire flow rate of air from fan 26 to the large ripening chamber 16. For chambers smaller than the large chamber 16, the same fan 26 is employed but a smaller diameter air injection port is selected according to the smaller size of the ripening chamber, and fan 26 is unloaded by spacing the mounting section 36 of housing 34 away from the surface of the wall to which control unit 10 is attached. This minor modification has been employed in the adaptation of control unit 10 to the four-lug container 76 shown in FIGS. 11-13, and will be further described in connection therewith.

The only other mechanical modification in control unit 10 required to adapt unit 10 to a smaller size ripening chamber is to replace orifice plug 48 with another orifice plug having a smaller diameter orifice 50. In connection with this minor modification, pressure regulator valve 30 is adjusted to a lower pressure, and then the desired reduced flow rate of ethylene gas to the smaller size ripening chamber will be effected without requiring any change in gas metering valve 52. For smaller sized ripening chambers, the carbon dioxide exhaust ports corresponding to ports 20 through walls 12 will be correspondingly smaller in diameter. Preferably, for any size ripening chamber corresponding to ripening chamber 16, there are two carbon dioxide exhaust ports corresponding to ports 20 proximate the bottom of the ripening chamber, and these are each approximately twice the diameter of the air injection port corresponding to port 24 through wall 12. This provides the carbon dioxide exhaust ports with a total of approximately eight times the cross-sectional area as the air injection port area from the fan. This larger carbon dioxide exhaust port area than the air injection port area cooperates with the generally downward circulation of air through the ripening chamber and the heavier density of the carbon dioxide than the air to allow the free flow of carbon dioxide out through the exhaust ports.

Referring now to FIG. 11-13, the four-lug container 76 includes an upwardly opening box 78 and a removable lid 80 which defines fruit ripening chamber 81 therein. A horizontal shelf 82 divides fruit ripening chamber 81 vertically into two sections, each of which is sized to receive two lugs of fruit. Horizontal shelf 82 is removably supported upon a peripheral upwardly facing shoulder 84 inside box 78, and is preferably made of a heavy wire mesh sufficiently strong to support two full lug boxes side by side thereon, but very porous so as to permit the free exchange of gases between the upper and lower halves of ripening chamber 81. Box 78 has a horizontal bottom wall 86 adapted to support the lower two lug boxes side by side. Bottom wall 86 has carbon dioxide exhaust ports 88 extending downwardly therethrough proximate the side walls of box 78 and positioned so that the lug boxes may be placed on bottom wall 86 without covering exhaust ports 88. Box 78 has downwardly projecting corner feet 90 which assure ventilating clearance below exhaust ports 88.

Gas mixture control unit 10 is attached to the outside of one wall 92 of box 78, in the upper half of wall 92 and preferably generally centered between the ends of wall 92. Thus, as shown in FIG. 12, the air injection port 94 associated with fan 26 of control unit 10 and the ethylene gas injection tube 22 of control unit 10 will both enter ripening chamber 81 in the upper portion of chamber 81 for the same reasons as described above for the large ripening chamber 16 in building structure 14. As seen in FIG. 13, air injection port 94 is much smaller in diameter than air injection port 24 to reduce the flow rate of air into ripening chamber 81 in proportion to the reduced size of ripening chamber 81. It is to be noted that the small air injection port 94 is generally aligned with a peripheral part of the fan 26 where the turbine blades are located as shown in FIG. 5. The mounting housing section 36 is spaced outwardly from the surface of wall 92 and arranged parallel to such surface by means of spacers 96 so as to provide a clearance 98 preferably of approximately ¼ inch. This clearance 98 allows escape of the air which is blown by fan 26 that does not pass through air injection port 94, thereby unloading fan 26.

Critical limits and ranges for ripening chamber temperature, ethylene gas concentration, time of exposure to ethylene gas, and carbon dioxide concentration are discussed in detail hereinafter in connection with the graphs illustrated in FIGS. 21-24.

Most fruits must be picked and shipped green, i.e., unripened, because of shipping problems with ripe fruit. In this regard, it is to be noted that the tomato is technically a fruit, and it is one of the ones that must be picked and shipped green. Then, these green fruits must normally be held in storage at the wholesaler's or the market for a ripening period of time generally on the order of two to three weeks. This not only occupies valuable space but the actual ripening times and market demands or needs rarely coincide. With the dynamic or active forms of the present invention illustrated in FIGS. 1-13, 25 and 26, fruit can be conventionally picked and shipped green, but then immediately upon arrival at the wholesaler's, market or other commercial user, or at any time during the normal ripening cycle, they can be placed in a fruit ripening chamber with which the gas mixture control unit 10 of the invention is associated and ripened with an ethylene gas exposure time of only about 24 hours, and then with a further holding time at room temperature on the order of about 12-36 hours, depending on the temperature, to allow the ripening process to proceed to completion.

Studies indicate that enzymic action within fruit that is associated with initial stages of ripening allows the fruit to absorb the ethylene gas employed in the invention, ethylene gas being a natural ripening agent. While this enzymic action will commence for most types of fruit while the fruit is still on the trees, for several types of fruit, including avocados and guavas, this enzymic action will not commence, and hence ripening will not commence, until the fruit has been picked from the trees. The condition of maturity of avocados is rated according to the percentage of oil content that has developed in the avocados. Normal picking range for avocados is when they have matured to an oil content of from about 12 percent to about 24 percent by weight, and in this normal picking range the enzymic action will start within a range of from about 7 days for an oil content of about 12 percent to 14 percent down to about 5 days for an oil content of about 22 percent to 24 percent. There is no observable ripening of any avocados until they have been off the tree for at least four days. Then if the avocados are retained at room temperature on the order of about 65° F. or more, normal ripening time from picking will be from about 21 days for the lower oil content avocados to about 14 days for the higher oil content avocados. However, conventionally all avocados are held within a close temperature range of between about 40° F. and 42° F. during storage, and this low temperature greatly retards the enzymic action, and therefore the ripening does not materially start until the temperature of the fruit is allowed to rise above about 55° F. and preferably above about 65° F. Thus, by sequencing a properly controlled storage temperature environment and application of the dynamic or active forms of the present invention so as to then ripen the avocados in a very short and completely predictable period of time, the availability of fully ripe avocados can be closely coordinated to the marketing or user's requirements. Whereas the carbon dioxide that is formed in the ripening process is, according to the invention, continuously and substantially completely removed automatically over the entire period of exposure to ethylene gas, the prior art procedure of opening the doors of the room to release carbon dioxide and replace the air and ethylene gas was not a really effective way of removing the carbon dioxide, and the lower lugs of fruit were usually in a sufficiently rich concentration of carbon dioxide that they did not ripen effectively. Tests show that in a typical ripening arrangement in which avocados take up approximately 60 percent of the room-sized chamber volume, within two hours the ripening avocados will give off sufficient carbon dioxide to raise its proportion to greater than 1 percent of the gas volume, and that proportion will almost completely block the absorption of ethylene gas, and hence the ripening process, as can be seen from the graph of FIG. 24.

Applicant is not aware of any prior art procedure for utilizing ethylene gas to accelerate the ripening of avocados in a small chamber such as the four-lug chamber form of the present invention shown in FIGS. 11-13.

FIGS. 14-20 illustrate the static or passive form of the present invention in the form of a home ripener unit generally designated 100. Ripener unit 100 includes a lower base section 102 and an upper cover section 104 which is preferably dome shaped for appearance and ease of manufacture, and is preferably transparent so that fruit contained therein can be observed during the ripening process.

Base section 102 has a bottom wall 106 that is preferably generally flat for stability and so as not to obstruct the free horizontal flow of air for exhausting carbon dioxide as described below. An annular side wall 108 extends upwardly from the periphery of bottom wall 106. Side wall 108 is preferably generally upright, but may be somewhat upwardly and outwardly stepped to provide an upwardly facing annular shoulder 110. An annular skirt portion 111 of side wall 108 extends above shoulder 110 and terminates at an out-turned upper annular rim 112 which mates at an annular sealing junction with the inner surface of an outwardly flared annular lip 114 at the lower edge of upper cover section 104. A handle 116 is formed in the top of upper section 104.

An annular fruit supporting shelf 118 rests peripherally upon the upwardly facing annular shoulder 110 of lower section 102 and is horizontally located in this position by the upper skirt portion 111 of lower section 102.

Figure 19:
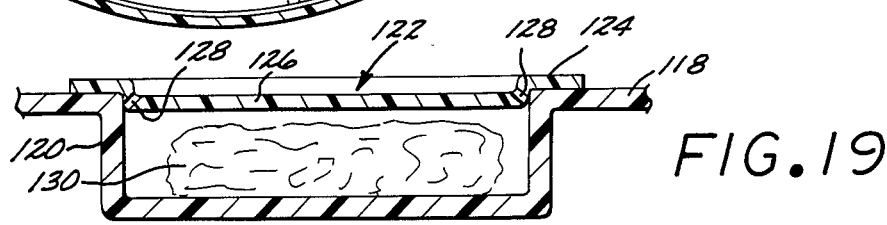
FIG. 19 is an enlarged, fragmentary view of the section designated "19" in FIG. 16 showing the container which receives the ethylene gas evaporative solution.

As best seen in FIG. 19, and also seen in FIG. 16, fruit supporting shelf 118 has a downwardly cupped central annular container 120 formed therein, and container 120 is covered during operation of ripener unit 100 by means of a removable lid 122. Lid 122 has a flat annular peripheral flange 124 and a flat central annular section 126 which is stepped below peripheral flange 124 and is adapted to seat in the top of container 120. Ethylene gas dispensing holes 128 extend through lid 122, preferably proximate the lower corner of the step between flange 124 and central section 126 so that should a piece of fruit happen to rest upon lid 122, it could not close off any of ethylene gas dispensing holes 128. Thus, the stepped configuration of the lid serves the two functions of locating the lid in covering position over container 120 and preventing ethylene gas dispensing holes 128 from inadvertently becoming cloesed off. Holes 128 are preferably two in number that are diametrically opposed, although more may be regularly annularly arranged about the periphery of central section 126 of lid 122. An absorbent ethylene gas dispenser pad 130 is saturated with a solution of ethylene gas and placed within container 120 for an operation cycle of ripener unit 100. Absorbent pad 130 may be made of cotton, nonwoven cloth, or the like. Ethylene gas evaporates from the solution held in absorbent pad 130 and a minute flow of ethylene gas is metered upwardly through dispensing holes 128 into the fruit ripening chamber generally designated 131 for the duration of a ripening cycle, which is preferably approximately 24 hours. Fruit ripening chamber 131 is the entire upper region or zone within ripener unit 100 above fruit supporting shelf 118. The ethylene gas solution in dispenser pad 130 and the concentrations of ethylene gas which this ethylene gas dispensing system produces within ripening chamber 131 will be described in detail below.

Figure 17:
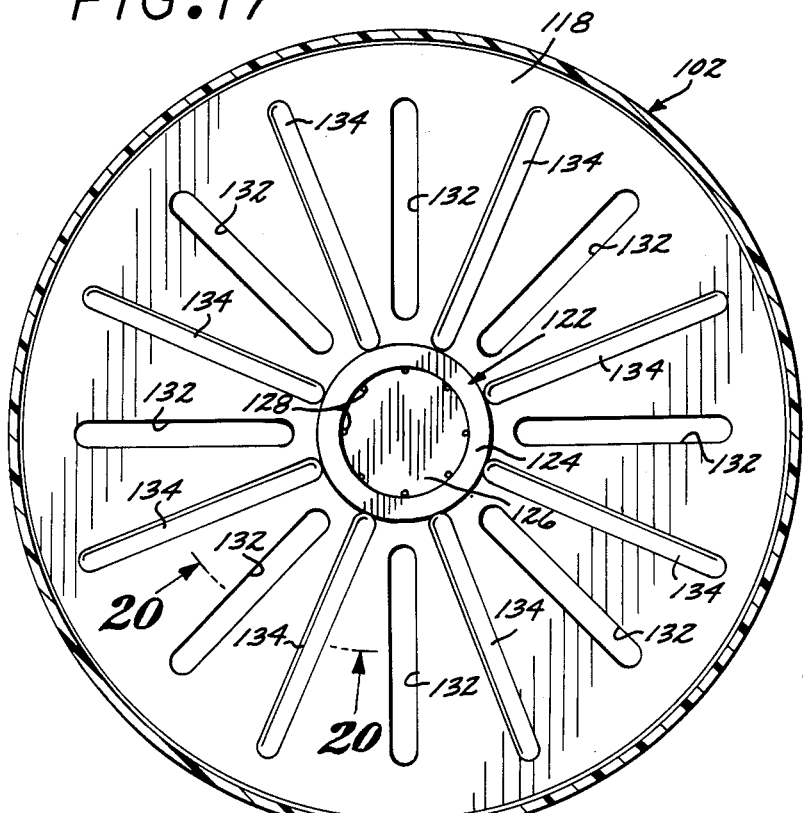
FIG. 17 is a horizontal section taken on the line 17—17 in FIG. 16.
Figure 18:
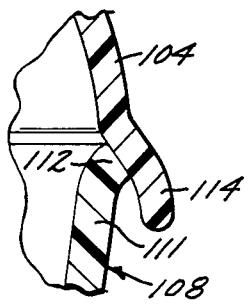
FIG. 18 is an enlarged, fragmentary section of the region designated "18" in FIG. 16 showing the peripheral seal between the lower and upper sections of the home ripener unit.
Figure 20:
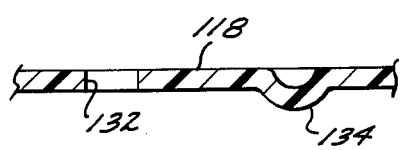
FIG. 20 is an enlarged, fragmentary vertical section taken on the line 20—20 in FIG. 17 showing one of the carbon dioxide gravity separation slots and one of the stiffening ribs in the fruit supporting shelf.

A regularly spaced annular array of radially oriented carbon dioxide separation slots 132 is provided through fruit supporting shelf 118. The greater than four-thirds density ratio of carbon dioxide to air coupled with the fact that carbon dioxide does not mix well with air will cause the carbon dioxide formed in ripening chamber 131 during the ripening process to drift downwardly through gravity separation slots 132 into carbon dioxide collection chamber 133, which is the region or zone within base section 102 below fruit supporting shelf 118. A regularly spaced annular series of radially oriented stiffening ribs 134 is formed in fruit supporting shelf 118 to give shelf 118 the strength to support up to about six pieces of fruit. Stiffening ribs 124 are preferably the same in number as carbon dioxide gravity separation slots 132 and alternately arranged between slots 132 around the generally disc-shaped supporting shelf 118 as seen in FIG. 17.

A series of generally upright carbon dioxide exhaust slots 136 extend through annular side wall 108 of lower section 102 of the ripener unit 100 below fruit supporting shelf 118 as seen in FIGS. 14, 15 and 16. These exhaust slots 136 are preferably at least four in number and are regularly spaced about the periphery of side wall 108. As carbon dioxide drifts downwardly out of ripening chamber 131 through gravity separation slots 132 into carbon dioxide collection chamber 133, prevailing air currents in the area where ripening unit 100 is being used will flow into one or more of the slots 136 on the upwind side of ripener unit 100 and displace carbon dioxide collected in chamber 133, causing such carbon dioxide to flow out of one or more of the exhaust slots 136 on the downwind side of ripener unit 100. At the same time, some of the air that enters through the upwind slot or slots 136 will, because of its lower density, flow upwardly through gravity separation slots 132 into ripening chamber 131 and displace the carbon dioxide that is moving downwardly from ripening chamber 131 through gravity separation slots 132. By having at least four carbon dioxide exhaust slots 136 regularly spaced about ripener unit 100, at least one of the exhaust slots 136 will always be generally directed upwind toward prevailing air currents in the region and at least one of the exhaust slots 136 will always be generally directed downwind away from prevailing air currents in the region, regardless of the direction of the air currents relative to unit 100.

The generally upright slots 136 have been selected for exhausting the carbon dioxide instead of holes of regular configuration based upon engineering studies for building ventilation which show that for an equal amount of aperture area generally upright slots are approximately 40 percent to 45 percent more efficient than regular holes. This efficient ventilation enables incoming air to not only generally continuously move carbon dioxide horizontally out of collection chamber 133 in the bottom of the unit and displace carbon dioxide from ripening chamber 131 in the upper part of the unit, but will also cause some of the incoming air to generally continuously replace some of the air-ethylene gas mixture in ripening chamber 131. This fresh air coming into ripening chamber 131 will generally continuously mix with the ethylene gas which enters chamber 131 from container 120 through dispensing holes 128 to maintain the desired ethylene gas concentration within ripening chamber 131.

The liquid solvent of ethylene gas carried in absorbent dispenser pad 130 preferably consists of approximately 100 percent (200 proof) ethyl alcohol. The ethylene gas is dissolved or absorbed into the ethyl alcohol by bubbling the ethylene gas into the alcohol for approximately 36 hours at a room temperature of approximately 70° F. within a chamber that is pressurized to approximately 25 psig. This produces maximum saturation of the ethylene gas in the alcohol, and with such saturation the ethylene gas and ethyl alcohol will vaporize together into atmospheric air in a vapor phase ratio of approximately 10 percent by volume of ethylene gas to approximately 90 percent by volume of ethyl alcohol vapor. Ethyl alcohol absorbs very little ethylene gas at atmospheric pressure, and appears to absorb a maximum amount of ethylene gas at approximately 25 psig. Heating the alcohol would reduce the saturation time, but would not increase the saturation amount.

Substantially pure ethyl alcohol appears to be the best absorption or dissolution medium for ethylene gas for several reasons. First, ethyl alcohol will absorb more ethylene gas than any other liquid of which applicant is aware. The very close chemistry between ethylene gas and ethyl alcohol appears to be the reason for this, ethylene gas being $C_2H_4$ and ethyl alcohol being $C_2H_5OH$. Second, ethyl alcohol is quite volatile, and vaporizes well with ethylene gas. Third, the ethyl alcohol that vaporizes along with the ethylene gas leaves no odor or taste whatsoever in ripened fruit. Some water may be present in the ethyl alcohol which is saturated with ethylene gas. There may be a small amount of water present in the ethyl alcohol from water vapor which has been absorbed. Applicant's testing has shown that if ethyl alcohol is diluted with distilled water to a 75 percent ethyl alcohol-25 percent water solution by volume, then half again more of such liquid saturated with ethylene gas must be used to obtain substantially the same performance in ripener unit 100 as for substantially 100 percent ethyl alcohol saturated with ethylene gas.

Absorbent dispenser pad 130 saturated with the ethyl alcohol-ethylene gas solution is preferably packaged in sealed aluminum foil. The overlying platelets of aluminum that form during the foil manufacturing process provide an excellent sealing wall for the ethylene gas.

Applicant's testing has shown that for a ripener unit 100 about 11 to 12 inches in diameter and about 8 to 10 inches high, with approximately 12 cc of ethyl alcohol-ethylene gas solution in absorbent dispenser pad 130, when the sealed aluminum foil packet is opened and saturated dispenser pad 130 placed in container 120 as shown in FIGS. 16 and 19, and four to six avocados placed on fruit supporting shelf 118 at any time after the above-described enzymic action has commenced, complete ripening of the avocados will occur with an ethylene gas exposure time of approximately 24 hours, and then a further ripening time of about 12 to 36 hours depending on room temperature. Sampling of the ethylene gas concentration in ripening chamber 131 over the 24-hour exposure period showed the ethylene gas concentration to be at approximately 800 parts per million at the beginning and down to about 40 to 60 parts per million at the end of a period of approximately 24 hours. This reduction in ethylene gas concentration over the exposure period results from the loss of some ethylene gas to the open air through carbon dioxide exhaust slots 136 and from some ethylene gas being absorbed by the fruit.

Applicant has determined through extensive experimentation and study that there are a number of critical physical limits and ranges to which it is necessary to adhere in order to assure proper ripening of fruit. Such critical physical limits and ranges are an important part of the present invention. These include (1) a critical temperature range within which the fruit pulp must be held to assure maximum absorption of ethylene gas; (2) a critical lower limit and optimum range to achieve full respiration of ethylene gas by the fruit; (3) a critical time period during which fruit must be exposed to ethylene gas to achieve a maximum percent respiration of ethylene gas in the bulk or body of fruit being subjected to the accelerated ripening process of the invention; and (4) a critical limit of the amount of carbon dioxide above normal which can be tolerated in achieving maximum ethylene gas absorption during the period of exposure of fruit to ethylene gas. These four critical ranges and limits are illustrated in respective FIGS. 21-24.

Figure 21:
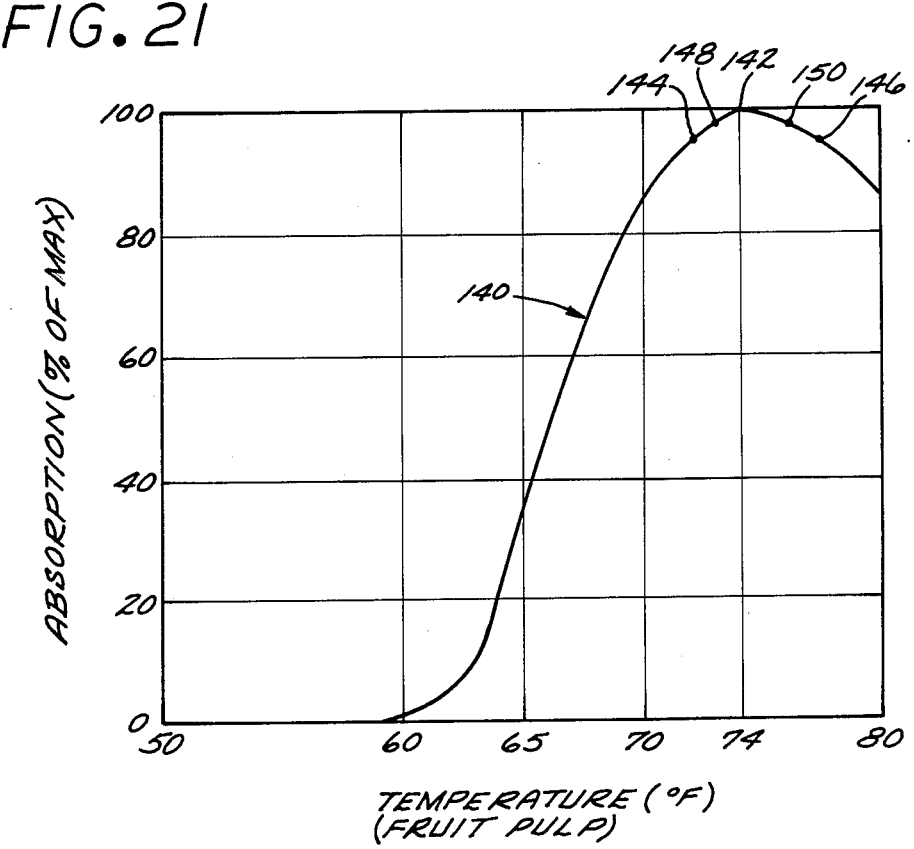
FIG. 21 is a graph which plots percent of maximum ethylene gas absorption against fruit pulp temperature during the ethylene gas exposure period.

Referring at first to FIG. 21, it shows a curve designated 140 which is a plot of percentage of maximum possible ethylene gas absorption along the vertical axis vs. temperature in degrees Fahrenheit of the fruit pulp along the horizontal axis. While fruit pulp temperature is the real physical criterion, applicant has found that it closely follows the temperature in the ripening chamber, so that monitoring of the ripening chamber temperature is sufficient to hold fruit pulp at the desired temperature. As indicated by curve 140, 100 percent of maximum ethylene gas absorption in the fruit is achieved at 74° F., and the percentage of absorption drops off dramatically below and above 74° F. For the process of the invention to be effective, it is critical that at least approximately 95 percent of maximum absorption of ethylene gas occur during the ethylene gas exposure period, and this occurs within the range of approximately 72°-77° F., indicated by points 144 and 146 on curve 140. It is most preferred that at least approximately 98 percent of maximum absorption of ethylene gas occur during the ethylene gas exposure period, and this occurs within the range of approximately 73°-76° F., indicated by points 148 and 150 on curve 140.

Figure 22:
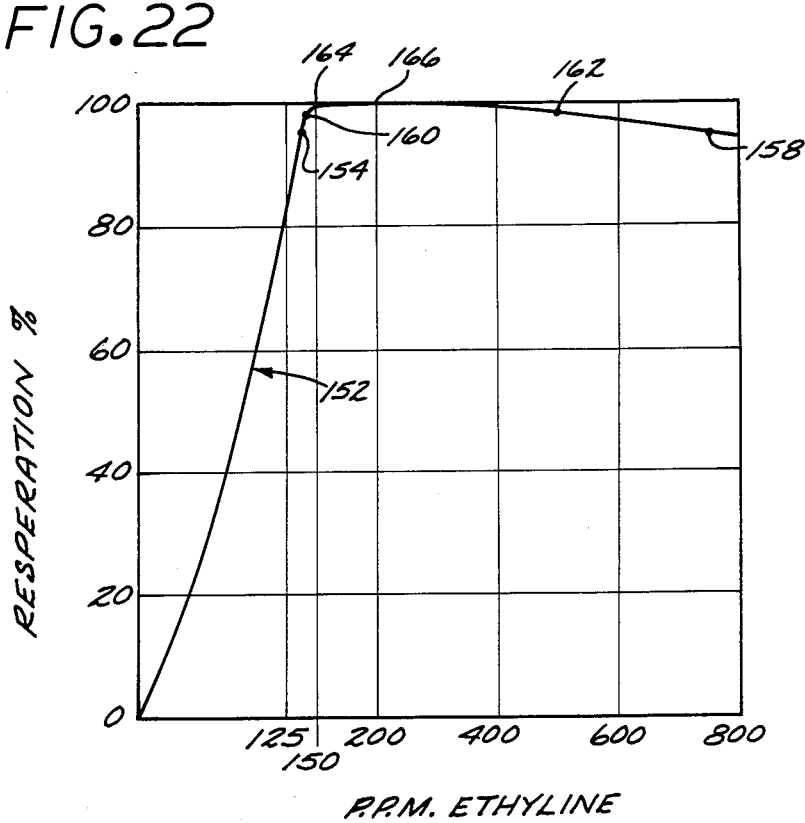
FIG. 22 is a graph which plots percent ethylene gas respiration against ethylene gas concentration in parts per million in the ripening chamber.

FIG. 22 shows a plot of respiration percentage on the vertical axis vs. parts per million ethylene gas concentration in the ripening chamber on the horizontal axis. "Respiration" refers to the exuding of carbon dioxide and absorbing of ethylene gas, the respiration process being triggered by the presence of ethylene gas which is sensed by the fruit. The curve in FIG. 22 is generally designated 152, and it will be seen that the curve rises sharply from zero percentage respiration at zero parts per million ethylene gas up to 100 percent respiration at approximately 150 parts per million ethylene gas, and then the curve holds steady at 100 percent respiration through 200 parts per million ethylene gas, and then very gradually tapers off and still shows approximately 94 percent respiration at 800 parts per million.

For the process of the invention to be effective, it is critical that at least 95 percent respiration occur, and this occurs at approximately 135 parts per million ethylene gas in the air within the ripening chamber, this point on curve 152 being designated 154. The curve tapers back down to 95 percent respiration at approximately 750 parts per million, so this critical 95 percent absorption range is from approximately 135 parts per million to approximately 750 parts per million. The 95 percent respiration, 750 parts per million point on curve 152 is designated 158. It is most preferred that at least approximately 98 percent respiration occur, and this will occur from approximately 140 parts per million to 500 parts per million, as designated by points 160 and 162 on curve 152. The optimum range produces substantially 100 percent respiration, and this is from approximately 150 parts per million to approximately 200 parts per million, designated by respective points 164 and 166 on curve 152. While close to 100 percent respiration will occur at considerably higher concentrations than 200 parts per million, any higher concentration would be undesirably as representing a waste of ethylene gas, and would require unnecessarily frequent replacement of the ethylene gas supply.

Figure 23:
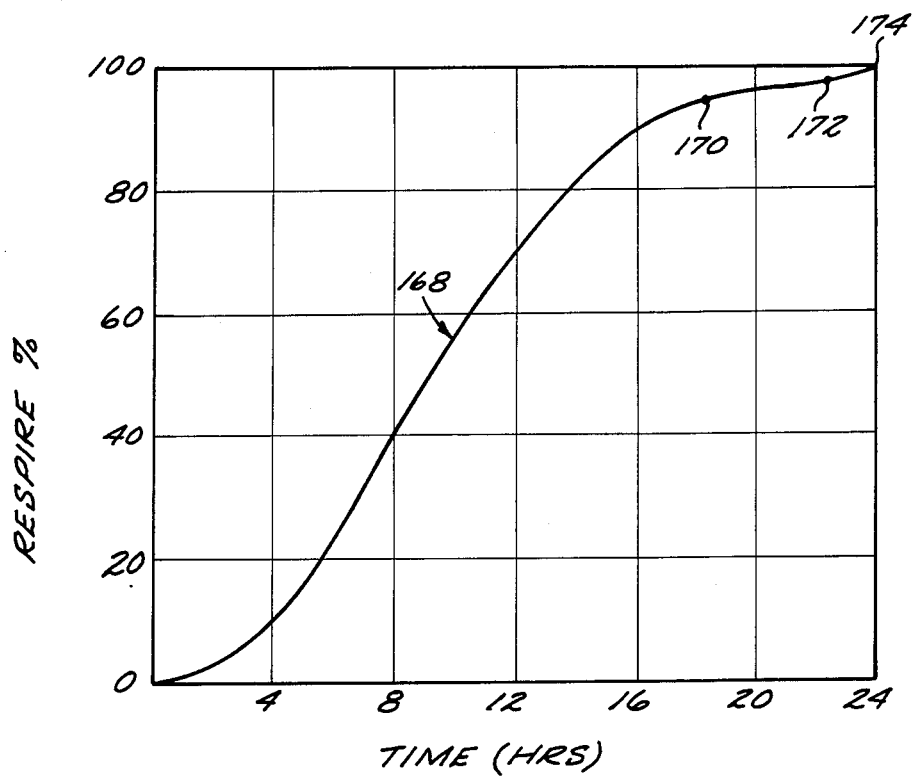
FIG. 23 is a graph which plots percent of fruit respire or respiration against time in hours, where the fruit pulp temperature is within the most preferred temperature range of approximately 73°–76° F. and with an ethylene gas concentration of approximately 150 parts per million.

The percent respiration curve depicted in FIG. 22 is based upon the fruit being held within the most preferred temperature range of approximately 73°-76° F. as depicted in FIG. 21, and for the preferred ethylene gas exposure time of approximately 24 hours as depicted in FIG. 23 and for a substantially normal carbon dioxide level as referred to hereinafter in connection with FIG. 24.

Referring now to FIG. 23, this shows a curve 168 which is a plot of respire percentage on the vertical axis vs. time in hours on the horizontal axis. Curve 168 represents the percentage respiration with approximately 150-200 parts per million ethylene gas in the ripening chamber and the temperature within the most preferred range of approximately 73°-76° F., and with substantially normal carbon dioxide content in the air of the ripening chamber. The respire or respiration percentage indicated on curve 168 in FIG. 23 is the percentage of fruit in the ripening chamber which has fully respired.

For the process of the invention to be effective, it is critical that at least approximately 95 percent of the fruit in the ripening chamber be fully respired, and this occurs at approximately 18 hours ethylene gas exposure in the ripening chamber. It is most preferred that at least approximately 98 percent of the fruit be fully respired, and this occurs at approximately 22.5 hours exposure to ethylene gas in the ripening chamber. Optimum, 100 percent respiration occurs at approximately 24 hours. The 18-hour point is indicated by numeral 170, the 22.5-hour point is indicated by numeral 172, and the optimum 24-hour point is indicated by numeral 174.

Figure 24:
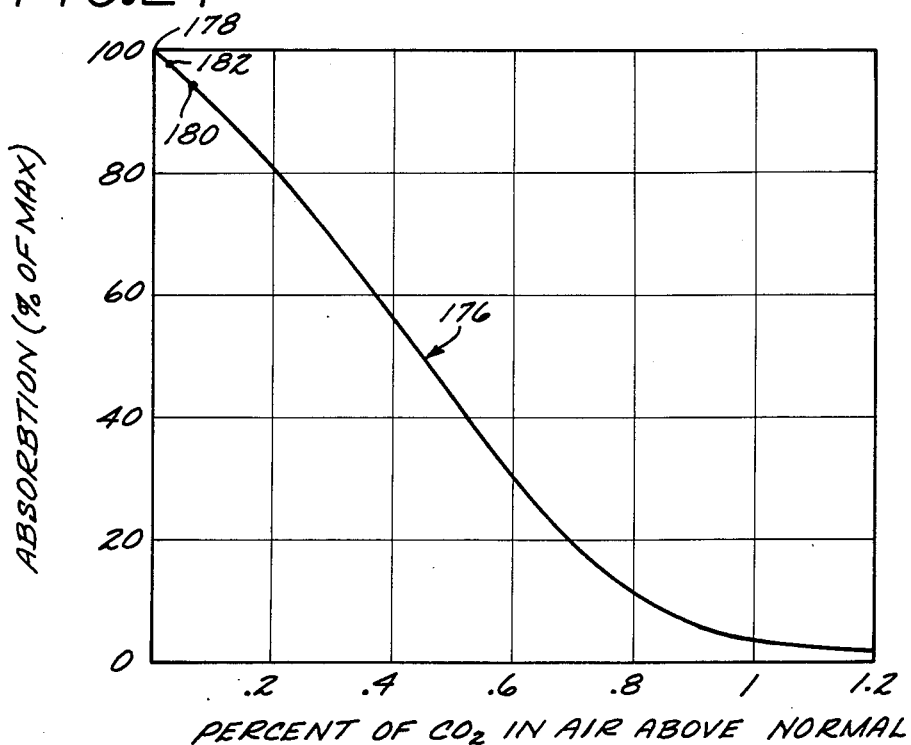
FIG. 24 is a graph plotting ethylene gas absorption percent of maximum by the fruit against percent carbon dioxide in the air of the ripening chamber above the amount of carbon dioxide normally found in the air.

FIG. 24 shows a curve 176 which is a plot of percent of maximum ethylene gas absorption along the vertical axis vs. percent of carbon dioxide in the ripening chamber above that which is normal for air. Curve 176 shows that with the normal $CO_2$ content in air, 100 percent ethylene gas absorption is achievable, as indicated at point 178. For the process of the invention to be effective, it is critical that at least approximately 95 percent of maximum absorption of ethylene gas occur during exposure time in the chamber, and it is seen from curve 176 that 95 percent absorption is achievable even though carbon dioxide content is approximately 0.05 percent above normal. The 95-percent point is designated 180. It is most preferred that at least approximately 98 percent of maximum absorption occur, and this can be achieved provided carbon dioxide content does not rise more than 0.02 percent above normal, as indicated by point 182 on curve 176.

According to the invention, carbon dioxide exuded by the fruit during the respiration process is expelled or drawn off from the bottom of the ripening chamber, and this is accomplished by continuously exchanging the air in the chamber. Applicant has determined by extensive experimentation that by completely exchanging the air in the ripening chamber at least approximately every 1.5 hours, 97-100 percent ripening of the fruit can be accomplished, provided the temperature is held within the most preferred range of approximately 73°-76° F., there is at least approximately 150 parts per million ethylene gas in the chamber, and the fruit is exposed to ethylene gas in the ripening chamber for approximately 24 hours. This indicates that the approximately 1.5 hour complete air exchange in the ripening chamber is serving to hold carbon dioxide concentration in the ripening chamber to within approximately zero to 0.02 percent above normal carbon dioxide content. Such small $CO_2$ concentrations are difficult to measure, so applicant's preferred method of suppressing $CO_2$ buildup is by timing the air exchange for substantially complete ripening of fruit, rather than measuring $CO_2$ concentration and adjusting the air exchange on such basis.

After the ethylene gas exposure of the fruit as described hereinabove in connection with FIGS. 21-24, further exposure to ethylene gas serves no useful purpose, according to applicant's experimentation. However, once the fruit has fully respired, a second stage of the ripening procedure is required for fruit to become fully ripened. This is simply allowing the fruit to stand for a further period of time, generally at room temperature. Since the fruit has substantially fully respired, it will not give off any further $CO_2$ to interfere with the ripening process. This second stage of the ripening process requires approximately 12-36 hours, depending on the temperature of the room in which the fruit is held. The warmer the room, the shorter the period of time this second stage of ripening requires. On the average, the second stage will require approximately 24 hours. Holding the fruit within the preferred temperature range of approximately 72°-77° F. will assure that the second ripening stage will be completed within approximately 24 hours.

Another feature of the invention is a method of putting the fruit on "hold" after the first stage of ripening, i.e., after the ethylene gas application stage, blocking the second and final stage of ripening for any period of time that may be desired. This method of putting the fruit on hold is to lower the room temperature in which it is held to below a critical temperature for each type of fruit. Such critical temperature for avocados is approximately 42° F., for bananas approximately 55° F., and for tomatoes approximately 50° F. Applicant has found that this procedure will completely block the final ripening stage for many days. Applicant has tested the procedure for avocados, and found that by holding them in the temperature range of approximately 38°-42° F., further ripening was completely blocked for a period of 30 days. Applicant believes that this hold period could be extended to approximately 60-70 days.

At the end of this hold period, the temperature is brought back up to room temperature, and then, according to how warm this temperature is, the second stage of ripening will commence in approximately 12-24 hours. The second stage of ripening will then proceed normally as described above.

One important reason for putting fruit on hold by the foregoing procedure is to coordinate availability of ripe fruit with short-term market demand variations. Another reason is to coordinate packing plant operations with work schedules. For example, if the normal schedule of operation of the invention would result in fruit becoming ripe on a normal day or days off, by putting the ripening process on hold the added expense of overtime pay can be avoided, the ripening process being completed when operators are available under their normal work schedules.

The holding operation can be manually or automatically scheduled by appropriate programming of a microprocessor which controls the operation.

FIGS. 25 and 26 illustrate a second active form of the invention, which it is preferred to use where the invention is applied to a room of an existing building. In this case, instead of blowing air into the ripening chamber to achieve the required air exchange for eliminating buildup of carbon dioxide, carbon dioxide is drawn off of the bottom of the room together with the air which is to be removed for the air exchange by evacuation, and air allowed to freely flow into the chamber to replace the evacuated air and carbon dioxide. It is generally easier to gain access to a room in an existing building through the ceiling, and an arrangement for effecting this is illustrated in FIGS. 25 and 26.

Referring to FIGS. 25 and 26, building structure 184 defines the ripening chamber 186. Ethylene gas is provided from ethylene gas supply source 188 through a pressure regulator 190 to a solenoid actuated valve which is controlled by a microprocessor 194 operatively associated with a control panel 196.

Solenoid acuated valve 192 is a normally closed valve, and the flow of ethylene gas is metered by being released by valve 192 at regular timed intervals and for regular durations of time, under the control of microprocessor 194. The flow of ethylene gas is further metered by the size of an output orifice associated with valve 192. The ethylene gas thus metered by valve 192 flows through a suitable conduit 198 which leads through roof 200 and ceiling structure 202 of building structure 184, releasing the ethylene gas in the upper part of ripening chamber 186. Microprocessor 194 controls the chamber temperature.

Carbon dioxide and air are ducted out of ripening chamber 186 by a series of pipes 104, 106 and 108 which open near floor 210 of chamber 186 so as to selectively remove the relatively heavy carbon dioxide, and extend to a plenum chamber 212 attached to ceiling structure 202. Pipes 204 extend to regions proximate the four corners of chamber 186, but not directly to the corners because they each have a substantial area of influence. Pipes 208 extend to regions near the sides of chamber 186 proximate its longitudinal center. With the six pipes 204 and 208 an elongated chamber like chamber 110 will be satisfactorily evacuated of carbon dioxide and air as required for the preferred air exchange cycle of approximately 1.5 hours to assure minimal carbon dioxide content above the normal amount in chamber 186.

Often trailers will be the most convenient structures for providing commercial ripening chambers for the present invention, providing elongated chambers such as that shown in FIGS. 25 and 26, so that the piping arrangement shown in FIGS. 25 and 26 would be typical for use in trailer ripening chambers. It is contemplated that other piping arrangements will be employed for chambers of other configurations.

The air and carbon dioxide are exhausted from plenum chamber 212 by means of a fan 214 located in the plenum opening to a chimney 216 which extends through ceiling structure 184 and roof 200. Chimney 216 has a no-draft type cap 218 at its top.

The air and carbon dioxide which are exhausted through chimney 216 are replaced by inflowing air which flows in through air intake conduits 220 extending from above through roof 200 and ceiling structure 184, and opening out in the upper part of chamber 186. These air intake conduits also preferably have no-draft type caps 222.

Air is automatically drawn in chamber 186 through conduits 220 by the slight reduction of pressure below atmospheric pressure in chamber 186 caused by exhausting the air and carbon dioxide by means of fan 214. Applicant has found that the invention works just as well by exhausting the air and carbon dioxide out of the chamber as illustrated in FIGS. 25 and 26 as it does when the air is blown into the chamber and carbon dioxide exhausted through openings near the bottom of the chamber as in the system illustrated in FIGS. 1–13.

The ethylene gas pressure established by regulator 190, intervals between ethylene gas injections provided by the opening of solenoid actuated valve 192, and size of the injection orifice at valve 192 are all adjusted according to the size of chamber 186 and taking into account the preferably 1.5 hour complete air exchange, to establish the desired ethylene gas concentration in chamber 186, which, as discussed in connection with FIG. 22, is most preferably in the range of from approximately 150–200 parts per million. A regulated pressure of approximately 5 psig has been found satisfactory. A presently preferred procedure for injecting the ethylene gas is to start the ripening cycle by a 30-second duration ethylene gas injection, and then continue with a 30-second duration injection every ten minutes, or six times an hour, for the entire ethylene gas exposure period of preferably approximately 24 hours.

For any particular size ripening chamber, with ethylene gas pressure at approximately 5 psig, and injecting for 30 seconds every ten minutes, the injection orifice associated with valve 192 is adjusted to give the desired ethylene gas concentration. Conditions in the chamber stabilize within approximately an hour from the start of the operation, and at that time the ethylene gas concentration can be checked, and the orifice changed as required, for startup where a new chamber is being employed.

It is important to employ an orifice sufficiently small so that should solenoid actuated valve 192 stick in the open position, the concentration of ethylene gas in the chamber can never reach explosive proportions. With the 30-second injections every ten minutes, the orifice is so small that the ethylene gas concentration can never come even close to an explosive mixture. Thus, where the operating mixture is adjusted to be 150 parts per million ethylene gas concentration, with the 30-second injection every ten minutes, the size injection orifice employed would not permit the concentration to reach more than 3,000–4,000 parts per million if valve 192 were stuck in the open position, and this is far below the 30,000–33,000 parts per million required for an explosive mixture.

Experimentation indicates that the smallest practical orifice would have a diameter of approximately 0.006 inch, while the largest employed in the experimentation had a diameter of approximately 0.044 inch.

If the time duration of the injections were briefer than the approximately 30-second injection that is preferred, then the orifice diameter would have to be increased to compensate and inject the same amount of ethylene gas, and if valve 192 were to become stuck open, this would then cause the ultimate concentration of ethylene gas to become greater than the approximately 3,000–4,000 parts per million maximum that could develop from the orifice size for the 30-second duration injections. In order to assure that the concentration does not come close to an explosive mixture, it is preferred that the injection duration not be less than approximately 20 seconds.

While the instant invention has been shown and described herein in what are conceived to be the most practical and preferred embodiments, it is recognized that departures may be made therefrom within the scope of the invention, which is therefore not to be limited to the details disclosed herein, but is to be accorded the full scope of the appended claims.

I claim:

1. The method of accelerating the respiration of fruit, which comprises the steps of:
    (a) placing the fruit in a substantially closed ripening chamber for exposure therein to a mixture of ethylene gas and air for a given exposure time,
    (b) positively controlling the temperature of said chamber during said exposure time to within the range of approximately 72°–77° F. which is effective to increase the rate of fruit respiration,
    (c) substantially continuously during said exposure time introducing air only from outside chamber into said chamber,
    (d) introducing ethylene gas only from a gas source containing gas which has not been circulated through said chamber into said chamber during said exposure time at a controlled rate that will establish and maintain an air/ethylene gas mixture within the range of approximately 135–750 parts per million of ethylene gas in said chamber during said exposure time that will increase the rate of fruit respiration during said exposure time,
    (e) substantially continuously during said exposure time exhausting the air/ethylene gas mixture from said chamber to which the fruit had been exposed for substantially complete exchange of the air-/ethylene gas mixture within an exchange period of time, said exchange period of time being less than said exposure time, and
    (f) simultaneously with step (e) substantially continuously during said exposure time exhausting from said chamber carbon dioxide that is a product of respiration of the fruit during the ripening process whereby the concentration of carbon dioxide allowed to build up within said chamber during said exposure time is insufficient to materially retard absorption of ethylene gas by said fruit.

2. The method of claim 1, wherein said exhausting of the air/ethylene mixture and carbon dioxide is accomplished by sucking them out of said chamber through exhaust aperture means located proximate a floor of said chamber.

3. The method of claim 2, wherein said exhausting comprises exhausting the air/ethylene gas mixture and carbon dioxide through a duct system proximate the floor of said chamber.

4. The method of claim 1, wherein said exhausting of the air/ethylene gas mixture and carbon dioxide is accomplished by blowing air into said chamber to force said air/ethylene gas mixture out of said chamber through exhaust port means proximate its bottom.

5. The method of claim 1, wherein said air and ethylene gas are introduced into an upper zone in said chamber to create a generally downward flow of the gases within said chamber whereby the downward flow operates with the higher density of carbon dioxide than air in said exhausting of carbon dioxide.

6. The method of claim 1, wherein said exchange period of time is not more than approximately 1.5 hours.

7. The method of claim 1, wherein said temperature control of said chamber is to within the range of approximately 73°–76° F.

8. The method of claim 1, wherein said air/ethylene gas mixture is within the range of approximately 140–500 parts per million of ethylene gas.

9. The method of claim 1, wherein said air/ethylene gas mixture has an ethylene gas concentration in the range of approximately 150-200 parts per million.

10. The method of claim 1, wherein said exposure time is within the range of approximately 18-24 hours.

11. The method of claim 1, wherein said exposure time is within the range of approximately 22.5-24 hours.

12. The method of claim 1, wherein said exposure time is approximately 24 hours.

13. The method of claim 1, wherein said temperature control is to within the range of approximately 73°-76° F., said air/ethylene gas mixture is within the range of approximately 140-500 parts per million of ethylene gas, and said exposure time is within the range of approximately 22.5-24 hours.

14. The method of claim 1, wherein said temperature control is to within the range of approximately 73°-76° F., said air/ethylene gas mixture is within the range of approximately 150-200 parts per million of ethylene gas, and said exposure time is approximately 24 hours.

15. The method of claim 1, further including the step of, after the completion of said exposure time, reducing the temperature of said chamber to a temperature substantially below said temperature range so as to substantially retard ripening of the fruit.

16. The method of claim 1, wherein said step of introducing ethylene gas is through a solenoid-actuated valve and through an orifice sufficiently small to prevent the concentration of ethylene gas from increasing to an explosive mixture should the valve stick open.

* * * * *